(12) United States Patent
Weindorf et al.

(10) Patent No.: US 9,091,883 B2
(45) Date of Patent: Jul. 28, 2015

(54) DISPLAY UNIT

(71) Applicant: Visteon Global Technologies, Inc., Van Buren Township, MI (US)

(72) Inventors: Paul Frederick Luther Weindorf, Novi, MI (US); Mark James Arthur Baker, Grays (GB); Daniel Gullick, Chelmsford (GB); Carl Evans, Chelmsford (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 76 days.

(21) Appl. No.: 13/937,647

(22) Filed: Jul. 9, 2013

(65) Prior Publication Data

US 2014/0022491 A1  Jan. 23, 2014

(30) Foreign Application Priority Data

Jul. 9, 2012 (GB) .................................. 1212191.9

(51) Int. Cl.
*G02F 1/1335* (2006.01)
*G02B 27/28* (2006.01)
*G02B 5/20* (2006.01)

(52) U.S. Cl.
CPC ........ *G02F 1/133617* (2013.01); *G02B 27/281* (2013.01); *G02F 1/133509* (2013.01); *G02F 1/133528* (2013.01); *G02B 5/205* (2013.01); *G02F 2001/133562* (2013.01)

(58) Field of Classification Search
CPC .................................................... G02F 1/1335
USPC ............................... 349/62, 96, 104, 122, 137
See application file for complete search history.

(56) References Cited

U.S. PATENT DOCUMENTS

| 6,263,133 B1 * | 7/2001 | Hamm ............................. 385/33 |
| 2003/0231394 A1 * | 12/2003 | Kimura .......................... 359/558 |
| 2006/0044495 A1 * | 3/2006 | Arai ................................ 349/114 |
| 2007/0285596 A1 * | 12/2007 | Lu et al. ........................... 349/59 |
| 2008/0030656 A1 * | 2/2008 | Watson et al. ................... 349/96 |
| 2012/0147299 A1 * | 6/2012 | Park ................................ 349/96 |

FOREIGN PATENT DOCUMENTS

JP          06347776 A     12/1994

* cited by examiner

*Primary Examiner* — Richard Kim
*Assistant Examiner* — Ryan Crockett
(74) *Attorney, Agent, or Firm* — Dickinson Wright PLLC

(57) ABSTRACT

A display unit for a motor vehicle, having a display area with a back-lit liquid crystal display device bounded by a border area is provided. The display unit includes a light source, and behind the display area a liquid crystal cell, a first polarizer and a second polarizer, the light source being configured to provide back-light illumination to the cell and the polarizers forming a pair of polarizers on opposite sides of the cell such that, in use, the first polarizer polarizes the illumination and the second polarizer either passes or blocks this illumination when the polarization of the illumination is rotated by the cell. A first cover sheet extends over said cell, and a second cover sheet extends over the first cover sheet.

17 Claims, 2 Drawing Sheets

69% N.D. Filter and separate Polariser

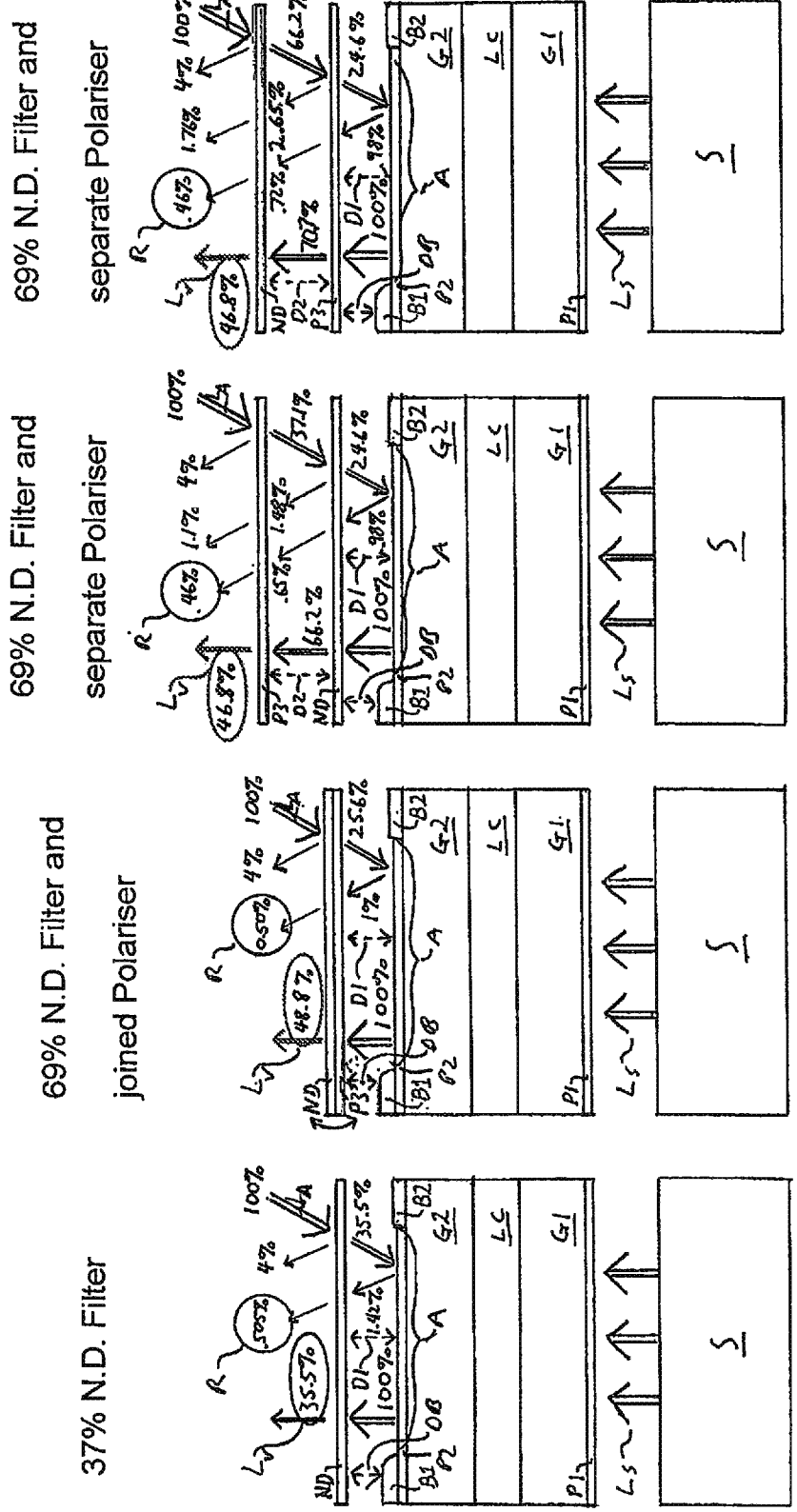

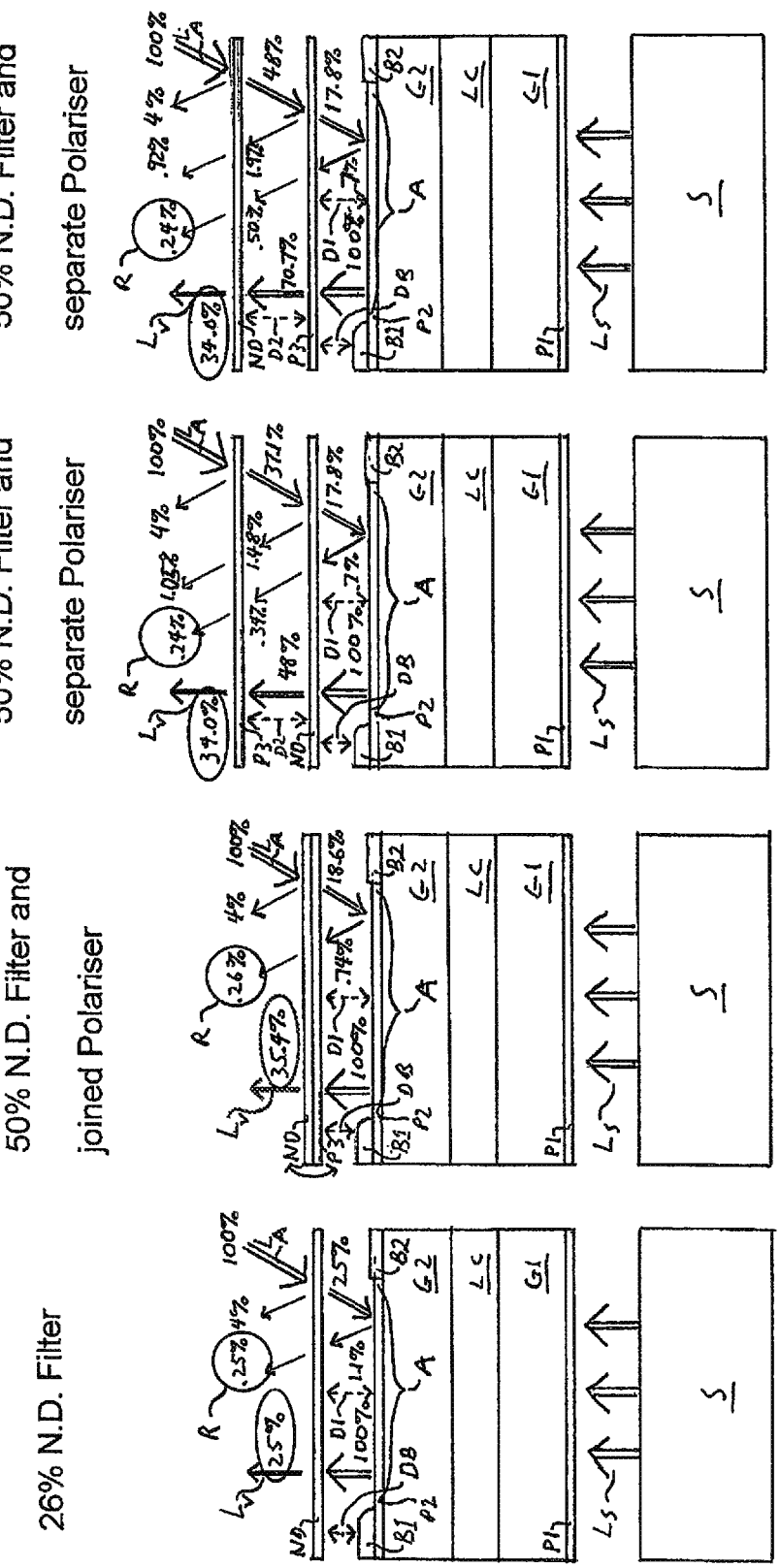

DISPLAY UNIT

CROSS REFERENCE TO RELATED APPLICATION

This U.S. Patent Application claims the benefit of United Kingdom Patent Application No. 1212191.9 filed Jul. 9, 2012, the entire disclosure of the application being considered part of the disclosure of this application, and hereby incorporated by reference.

BACKGROUND

There has been a trend in recent years for motor vehicle displays to increase in size and to become more complex functionally. There is, however, a limit to the size and complexity of practical automotive displays incorporating numerous separate display devices, in the same area or in overlapping areas within a single display unit, for example, mechanical dials, gauges and warning lights. Dashboard space is also increasingly at a premium in automobiles.

Rather than increasing the number of components, size, complexity and cost of display units, there is a trend for increasing use of liquid crystal display (LCD) devices in automotive dashboard display units, either by increasing the size of a single LCD device or by using multiple LCD devices. Such LCD devices may, of course, also be used in conjunction with other display devices within the same display unit.

Often, there is a desire to maximize the so-called "dark panel" effect, which is the partial or full concealment of display elements, including back-lit LCD devices, when not in use, so that such display elements or their outlines blend into a surrounding background area within the display unit. To the eye, the concealed display devices and their associated display areas then appear dark, even in bright ambient lighting conditions.

An automotive dashboard display unit will normally have a clear or partially absorbing cover sheet spaced in front of the display devices and display areas of the display unit. If partially absorbing, the cover sheet will be visually clear (i.e. non-scattering) and may either have a neutral color such as grey, or may alternatively be tinted with a color for visual appeal. All such partially absorbing cover sheets, whether of neutral color or tinted, will be referred to herein as "neutral density filters".

Often the cover sheet will be shielded by a protruding bezel or display surround and be angled so as not to direct stray reflections or bright lights or daylight back towards the eyes of the viewer. The effect of ambient light reflected from the cover sheet is then minimised. However, a significant amount of ambient light will still, of course, be incident on the display areas. Although reflective LCD devices may benefit from such reflected ambient light, this disclosure relates to back-lit LCD devices where ambient light is not used to display information displayed by the LCD device. Such ambient light, when scattered or reflected back towards the viewer from the display unit can reduce the contrast of the displayed information by the back-lit LCD device.

Returned ambient light can also illuminate or emphasize the outer surface of the LCD device itself or the edge or border between the LCD device one or more areas bounding or surrounding the LCD display area, whether or not the LCD is active. Such returned light impairs the dark panel effect.

In such circumstances, one way of improving the dark panel effect is to use a neutral density filter above the display area which reduces the intensity of ambient light incident on the display area and also reduces the intensity of any returned light that is scattered or reflected back towards the viewer. Such a neutral density filter is often incorporated within the outermost cover sheet spaced in front of the display devices and display areas of the display unit. Although the neutral density filter can substantially eliminate returned ambient light such that the dark panel effect is maximized, this is at the cost of reducing the intensity of the transmitted light visible to the user from all light sources within the display unit. It has been found in practice that to achieve a good dark panel effect using such a neutral density filter, it is necessary for the filter to have a transmission of about 37% and to achieve an excellent dark panel effect using such a neutral density filter, it is necessary for the filter to have a transmission of about 26%. To compensate, it becomes necessary to increase the luminance of light sources such as those used to illuminate back-lit LCD devices, with a consequent increase in power consumption and cost for the display unit.

This disclosure provides a display unit having an improved dark panel effect while maintaining an adequate contrast ratio and display brightness in a back-lit LCD device within a display unit.

SUMMARY

The disclosure relates to a display unit, and in particular relates to a display unit for a motor vehicle, having a display area with a back-lit liquid crystal display (LCD) device, and also to such an LCD device bounded on at least one side by a border area.

There is provided a display unit for presenting visible information to a viewer of the display unit, said unit comprising: a back-lit liquid crystal display (LCD) device, said device comprising a display area for displaying said visible information, a light source, and behind said display area a liquid crystal cell, a first polarizer and a second polarizer, said light source being configured to provide back-light illumination to said cell and said polarizers forming a pair of polarizers on opposite sides of said cell such that when said back-light illumination is provided, the first polarizer polarizes said illumination and the second polarizer either passes or blocks said illumination when the polarisation of said illumination is rotated by said cell; a first cover sheet extending over said cell; and a second cover sheet extending over the first cover sheet; wherein one of said first and second cover sheets comprises a third polarizer and the other of said first and second cover sheets comprises a neutral density filter, the third polarizer being aligned with the second polarizer whereby the illumination passed by the second polarizer is passed by the third polarizer, and the first cover sheet is separated from the display area of the LCD device by a gap, and whereby ambient external light incident on the LCD device and reflected or scattered back towards the viewer from said display area is attenuated by two passes through the neutral density filter, and by two passes through the third polarizer sheet.

In some embodiments, the first cover sheet comprises the third polarizer and the second cover sheet comprises the neutral density filter. In alternative embodiments of the invention, the first cover sheet comprises the neutral density filter and the second cover sheet comprises the third polarizer.

Because the third polarizer has the same polarisation properties as that of the second polarizer, the third polarizer does not significantly attenuate the polarized light transmitted from the LCD device. The third polarizer will, however, attenuate at least half of the ambient unpolarized light which has been admitted into the display unit towards the display area.

There are a number of advantages to providing the gap between the first cover sheet and the display area, rather than placing the first cover sheet directly on the outer surface or display area of the LCD device. The first is that the LCD device may not have a uniform surface near its edges, as the layers forming the LCD device will need to be bonded together or held together in a frame. Another is that the LCD device will often be bounded by one or more areas on one or more edges of the LCD display area. There may be a step or gap between the LCD display area and such surrounding areas where these border each other. By providing the gap, the first cover sheet can be stretched across any such features or discontinuities, thereby making it possible in principle to provide a smooth outer surface to the display. At the same time, the outer surface of the LCD device is visually concealed from the viewer in returned ambient illumination.

Therefore, when the display unit comprises one or more border areas that lie adjacent to the display area in view of a viewer of the display unit, the first cover sheet preferably extends over such border areas with the first cover sheet being separated from border areas by a gap. This arrangement then helps to visually conceal the outer surface of the, or each, border area, such that ambient external light incident on the LCD device and reflected or scattered back towards the viewer from border area(s) is attenuated by two passes through the neutral density filter, and by two passes through the third polarizer.

Most preferably, the ambient light reflected or scattered back towards the viewer from the display area of the LCD device is substantially the same (e.g. in terms of luminance and/or color spectrum) as the ambient light reflected or scattered back towards the viewer from the border areas. This is so that after attenuation by the first and second cover sheets the, or each, edge of the display is concealed.

In some embodiments, the first cover sheet is joined to the second cover sheet so there is no gap between these sheets.

In other embodiments, the first cover sheet and the second cover sheet are also separated by a gap. In contrast with an arrangement in which the first and second cover sheets have no such gap, for example, by being bonded to each other, this provides the advantage that the first cover sheet and the second cover sheet need not be parallel with each other. Then, when the third polarizer is provided by the first cover sheet, the first cover sheet can be oriented so that this is parallel with the second polarizer, thereby ensuring that the axes of the second polarizer and third polarizer are as closely aligned as possible. At the same time, the second cover sheet, which will include the neutral density filter, can be angled so as to minimise the reflection of ambient light off the outer surface of the second cover sheet directly into the eyes of the viewer.

It will often be the case that border areas near or adjacent the display area are substantially planar, in which case, the first cover sheet is preferably parallel with such border areas.

The display area of the LCD device will also normally be substantially planar, in which case the first cover sheet is preferably parallel with the display area.

In an embodiment, the display area and the border areas are substantially co-planar with each other such that the respective gaps between the border areas and the first cover sheet are substantially the same.

Preferably, the neutral density filter transmits between about 40% and 80% of light incident at a normal angle on the neutral density filter. Most preferably, the neutral density filter transmits between about 50% and 70% of the light incident at a normal angle on the neutral density filter.

In order to achieve a good dark panel effect, it is preferred if the neutral density filter transmits about two-thirds of the light incident on the filter, the ambient light returned to the viewer of the display from the display area being about 0.5% of the total ambient light incident on the second cover sheet. Then, the first and second cover sheets transmit about half of the illumination from the display area out from the second cover sheet.

In order to achieve an excellent dark panel effect, it is preferred if the neutral density filter transmits about half of the light incident on the filter, the ambient light returned to the viewer of the display from the display area being about 0.25% of the total ambient light incident on the second cover sheet. Then, the first and second cover sheets transmit about one-third of the illumination from the display area out from the second cover sheet.

BRIEF DESCRIPTION OF THE DRAWINGS

The disclosure will now be further described, by way of example only, and with reference to the accompanying drawings, in which:

FIG. 1 is a schematic diagram representing a display unit for presenting visible information to a viewer of the display unit and capable of providing a good dark panel effect, comprising a back-lit liquid crystal cell having first and second polarizers and a neutral density filter (with a 37% pass), separated by a gap from the cell;

FIG. 2 is a schematic diagram showing a display unit for presenting visible information to a viewer of the display unit and capable of providing a good dark panel effect, comprising a back-lit liquid crystal cell having first and second polarizers and a joined neutral density filter (with a 69% pass) and third polarizer that are separated by a gap from the cell;

FIGS. 3 and 4 are schematic diagrams showing a display unit for presenting visible information to a viewer of the display unit and capable of providing a good dark panel effect, comprising a back-lit liquid crystal cell having first and second polarizers and a separated neutral density filter (with a 69% pass) and third polarizer, one of which is separated by a gap from the cell;

FIG. 5 is a schematic diagram representing a display unit for presenting visible information to a viewer of the display unit and capable of providing an excellent dark panel effect, comprising a back-lit liquid crystal cell having first and second polarizers and a neutral density filter (with a 26% pass), separated by a gap from the cell;

FIG. 6 is a schematic diagram showing a display unit for presenting visible information to a viewer of the display unit and capable of providing an excellent dark panel effect, comprising a back-lit liquid crystal cell having first and second polarizers and a joined neutral density filter (with a 50% pass) and third polarizer that are separated by a gap from the cell; and FIGS. 7 and 8 are schematic diagrams showing a display unit for presenting visible information to a viewer of the display unit and capable of providing an excellent dark panel effect, comprising a back-lit liquid crystal cell having first and second polarizers and a separated neutral density filter (with a 50% pass) and third polarizer, one of which is separated by a gap from the cell.

DETAILED DESCRIPTION

FIGS. 1 and 5 illustrate two embodiments of a display unit for presenting visible information to a person viewing the display unit. The display units comprise a source of visible light (S) for providing back-light illumination ($L_S$) to a liquid crystal display (LCD) device which comprises a display area (A) for displaying visible information. The light source is therefore behind the display area of a liquid crystal cell, the cell comprising a first polarizer (P1) on the outside of a first glass substrate (G1) nearest the light source and a second polarizer (P2) on the outside of a second glass substrate (G2) directly behind the display area.

Sandwiched between the two glass substrates is a liquid crystal layer (LC) comprising a liquid crystal fluid medium. The liquid crystal cell may be any known type of cell. Not shown are other conventional components of the cell, all of which will be well-known to those skilled in the art, such as, for example, glass bead spacers, and transparent electrodes on the glass substrates for activating and deactivating the liquid crystal medium.

The light source (S) is configured to provide the back-light illumination ($L_S$), which will usually be unpolarized light, to the cell, passing first into the first polarizer (P1), then the liquid crystal layer (LC) and then the second polarizer (P2). Optionally, the first polarizer may be incorporated into the light source. The polarisation axes of the polarising layers (P1, P2) may either be parallel with respect to each other or be crossed, and if crossed will usually be (in the case of linear polarizers) at right angles to each other. If parallel, then the second polarizer will block illumination for which the LCD rotates the polarisation, and if crossed the second polarizer will pass illumination for which the LCD rotates the polarisation. Conversely, if the polarisation axes are parallel, then the second polarizer will pass illumination for which the LCD does not rotate the polarisation, and if crossed the second polarizer will block illumination for which the LCD does not rotate the polarization.

Although the polarizers will most often be linear polarizers, it may alternatively be the case that the polarizers are circular polarizers, either with the same left or right polarisations or with opposite left and right polarizations.

In either case, it is preferred that all polarizers used with the illustrated display units should have no or low birefringence.

The front surface of the display area (A) may be provided by, as drawn, the second polarizer (P2), however, it is also known for the outer layer of the LCD device to be a transparent layer. Similarly, the first polarizer (P1) need not provide the outer layer of the cell nearest the light source if this is provided by a transparent layer.

The display area is bounded by at least one border, which in most cases will be opaque. In the drawings, two border elements or features are illustrated, one of which (B1) stands proud of the surface, and the other of which (B2) is flush or substantially flush with the surface. Such border elements may extend fully around the display area (A), which will often be square or rectangular in outline, or just along some of the sides of the display area.

Each of the display units of FIGS. 1 and 5 is capable of providing a dark panel effect, i.e. the partial or full concealment of display elements, including the back-lit LCD device and any border features, when not in use, so that such display elements or their outlines substantially disappear from view. This is achieved by use of a neutra density filter (ND) spaced in front of the display area (A) and any border features (B1, B2) by a gap. The gap (D1) with the display area will normally be greater than or equal to the gap (DB) above any protruding or flush border features (B1, B2). The gap may also vary in width if the cover sheet is not parallel with the display area. The neutral density filter is therefore separate from a front surface of the display area (A), and may be provided by an outmost cover for the display unit.

The neutral density filter suppresses the view of the unactive display areas, any border features, and joins or boundaries between the un-active display area and border features, by reducing the amount of ambient light scattered or reflected from these features and directed back towards the person viewing the display unit. In FIG. 1, the neutral density filter passes 37% of the light entering the filter, and in FIG. 5, the neutral density filter passes 26% of the light entering the filter.

In all the Figures, the incident ambient light ($L_A$) in the drawings is shown as being incident at a non-normal angle to the filters and display areas, and this is done only for the sake of clarity so that different reflections can be seen, however in all cases the stated reflection and transmission percentages are those for a normal angle of incidence. Ambient light will, of course, have a range of angles of incidence, however, the stated percentages do illustrate in general terms the performance of the devices described below.

In all the Figures, it has been assumed that the reflectance of light off an external surface will be 4%, although this figure may be somewhat lower if antireflection coatings are provided. In these examples, 4% of incident ambient light ($L_A$) will be reflected by the neutral density filter, and 96% transmitted into the body of the neutral density filter (ND). In FIG. 1, 37% of this is transmitted (35.5%) and in FIG. 5, 26% is transmitted (25%). After 4% reflection off the display area (A) and similar losses due to reflection and transmission in the second pass through the neutral density filter, FIGS. 1 and 5 show that there will be, respectively, 0.5% and 0.25% remaining ambient reflected light (R). Subjectively, these amounts can be classed as a "good" dark panel effect and an "excellent" dark panel effect.

The neutral density filter (ND) also absorbs the transmitted polarized light from the light source, such that of the light exiting the display area visible to the user ($L_V$) is reduced to, respectively, 35.5% and 25% of the transmitted polarized light exiting the display area (A).

These results are summarized in Table 1 below. Commercially available LCD devices can provide a luminance of typically 200 to 500 cd/m². High luminance displays from about 500 cd/m² up to approximately 1000 cd/m² are available, but at a relatively high commercial cost for automotive driver display uses. Partly, this additional cost is as a result of having to provide a heat exchange cooler on the light source (S) to keep this within operating temperature bounds. In Table 1, this available but relatively expensive range is indicated by source luminance $L_S$ figures that have been underlined.

Luminance displays significantly above 1000 cd/m² are not commercially feasible for automotive driver display uses. In Table 1, this limit is indicated by the dashed line in the table and source luminance $L_S$ figures shown in bold.

Table 1 shows how much source luminance ($L_S$) is required to achieve four different levels of luminance visible to the user ($L_V$), namely: a minimally usable level of visible luminance of 200 cd/m², suitable mainly in dark ambient lighting conditions; an acceptable visible luminance of 350 cd/m², this being the minimum amount suitable for both dark and light ambient lighting conditions; a good visible luminance of 500 cd/m², which is a more preferable amount suitable for both dark and light ambient lighting conditions; and an excellent visible luminance of 650 cd/m², which is the amount suitable even in very bright ambient lighting conditions.

TABLE 1

| | | Luminance required from Source: $L_S$ (cd/m²) | | | | | |
|---|---|---|---|---|---|---|---|
| | | Good Dark Panel Effect (R≈0.5% returned reflection) | | | Excellent Dark Panel Effect (R≈0.25% returned reflection) | | |
| Luminance Visible to Viewer: $L_V$ (cd/m²) | Luminance Level | ND Filter alone (FIG. 1) $L_V/$ 35.5% | Joined P & ND Filters (FIG. 2) $L_V/$ 48.8% | Separate P & ND Filters (FIGS. 3 & 4) $L_V/$ 46.8% | ND Filter alone (FIG. 5) $L_V/$ 25% | Joined P & ND Filters (FIG. 6) $L_V/$ 35.4% | Separate P & ND Filters (FIGS. 7 & 8) $L_V/$ 34.0% |
| 200 | Adequate luminance required in dark ambient lighting conditions | 563 | 410 | 427 | 800 | 565 | 588 |
| 350 | Acceptable luminance for all normal ambient lighting conditions | 986 | 717 | 748 | 1400 | 989 | 1029 |
| 500 | Good luminance for all normal ambient lighting conditions | 1408 | 1025 | 1068 | 2000 | 1412 | 1470 |
| 650 | Luminance required in extreme conditions | 1831 | 1332 | 1389 | 2600 | 1836 | 1912 |

As can be seen from Table 1, with commercially feasible light sources (S), the neutral density filter (ND) approach is capable of achieving only an acceptable visible luminance for a good dark panel effect of about 0.5% returned ambient light (R) and is only capable of achieving a minimally usable visible luminance for an excellent dark panel effect of about 0.25% returned ambient light (R).

As shown in FIGS. 2-4 and 6-8, the aspects disclosed herein address this limitation by using both a neutral density filter (ND) and an additional, third polarizer (P3), both of which are spaced apart from the display area (A), and optionally also spaced apart from adjacent raised, flush or substantially flush border features (B1, B2) by a gap (D1, DB). In FIGS. 2-4 and 6-8, components such as the light source (S) and LCD device (P1, G1, LC, G2, P2) are the same as in the devices described above in relation to FIGS. 1 and 5, and so will not be described again in detail. As in the devices of FIGS. 1 and 5, the first polarizer (P1) may alternatively be incorporated in the light source (S), and the LCD cell may comprise additional transparent layers, as will be known to those skilled in the art.

The third polarizer (P3) has the same polarisation as the second, or upper polarizer (P2) of the LCD device, so that this third polarizer has a minimum attenuation of display light emitted by the LCD device. The third polarizer will, however, strongly attenuate unpolarized ambient light ($L_A$). Practical, low cost sheets of linear polarizers will transmit about 73.7% of incident light polarized in the same direction as the polarizer, and will pass about 38.7% of unpolarized light entering the polarizer.

FIGS. 2-4 show embodiments which achieve a good dark panel effect of about 0.5% and FIGS. 6-8 show embodiments which achieve an excellent dark panel effect of about 0.25%.

In FIGS. 2 and 6, the neutral density filter (ND) and third polarizer (P3) are joined or bonded together and, for a given absorption by the neutral density filter (ND), the same result will be achieved regardless of which of these two elements is closest to the display area (A). The position of these two elements may therefore be interchanged, as indicated by the double headed arrow extending between the neutral density filter (ND) and third polarizer (P3).

FIGS. 3, 4, 7 and 8 show arrangements where the neutral density filter (ND) and third polarizer (P3) are separate elements, being separated by a gap (D2). The same optical result is achieved regardless of which of these elements is closest to the display area (A).

With the addition of the third polarizer (P3), FIGS. 2-4 show that, in achieving the same good dark panel effect (R) of about 0.5% as that of the arrangement of FIG. 1, the neutral density filter (ND) can be made more transmissive, with an increase from 37% to 69%. As a result, the intensity of the visible light ($L_V$) from the display is increased from 35.5% to 48.8% in the case of FIG. 2, and to 46.8% in the cases of FIGS. 3 and 4.

With the addition of the third polarizer (P3), FIGS. 6-8 show that, in achieving the same excellent dark panel effect (R) of about 0.25% as that of the arrangement of FIG. 5, the neutral density filter (ND) can be made more transmissive, with an increase from 26% to 50%. As a result, the intensity of the visible light ($L_V$) from the display is increased from 25% to 35.4% in the case of FIG. 6, and to 34.0% in the cases of FIGS. 7 and 8.

These results are summarized in Table 1, which show that with commercially feasible light sources (S), the arrangements of FIGS. 2-4 are capable of achieved a good visible luminance for all normal light conditions and with a good dark panel effect of about 0.5% returned ambient light (R), and the arrangements of FIGS. 6-8 are capable of achieved an acceptable visible luminance for light and dark ambient light conditions and with an excellent dark panel effect of about 0.25% returned ambient light (R).

The aspects disclosed herein allow improvement in both user visibility of information displayed by the LCD device and at the same time improved dark panel effect.

The arrangements of FIGS. 3 and 4 provide other potential benefits, owing to the separate provision of the neutral density filter and third polarizer. For optimum performance in terms of blocking reflected ambient light while still passing displayed polarized light, the third polarizer should be as near to parallel to the LCD device as possible. Polarizers also tend to be more expensive that neutral density filters. Both these factors militate towards positioning the third polarizer in proximity with and parallel to the LCD device.

It may, however, be desired to position the neutral density filter at an angle to the plane of the LCD device, so as to direct stray ambient light reflections off the outer and inner surfaces of the neutral density filter away from the eyes of the viewer. The neutral density filter can then be provided in the outermost cover of the display unit and this of course may need to be considerably larger than the dimensions of the inner, third polarizer. The increased size of the neutral density filter as opposed to that of the third polarising filter will not be an issue in terms of cost.

When the display area has a border or frame, then the appearance of this can be minimised if the ambient light reflected or scattered back towards the viewer from the display area of the LCD device is substantially the same (e.g. in terms of luminance and/or color spectrum) as the ambient light reflected or scattered back towards the viewer from the border areas.

The disclosure provides, for a given back-light source, a display unit having a improved dark panel effect while maintaining adequate contrast ratio and display brightness in a back-lit LCD device within the display unit.

The invention claimed is:

1. A display unit to present visible information to a viewer of the display unit via a back-lit liquid crystal display (LCD) device, said unit comprising:
   a display area to display the visible information;
   a light source;
   a liquid crystal cell;
   a first polarizer and a second polarizer, the light source being configured to provide back-light illumination to the liquid crystal cell and the first polarizer and the second polarizer forming a pair of polarizers on opposite sides of the liquid crystal cell, and in response to back-light illumination being provided, the first polarizer polarizes the back-light illumination and the second polarizer either passes or blocks the back-light illumination in response to the polarization of the back-light illumination being rotated by the liquid crystal cell;
   a first cover sheet extending over the liquid crystal cell; and
   a second cover sheet extending over the first cover sheet, one or more border areas, the one or more border areas lying adjacent to the display area in view of the viewer, the first cover sheet extending over said border areas and the first cover sheet being separated from the one or more border areas by a gap, the one or more border areas being on top of and separate from the back-lit LCD device;
   wherein one of the first and second cover sheets includes a third polarizer and the other of said first and second cover sheets comprises a neutral density filter, the third polarizer being aligned with the second polarizer whereby the back-light illumination passed by the second polarizer is passed by the third polarizer, and the first cover sheet is separated from the display area of the LCD device by a gap, and whereby ambient external light incident on the back-lit LCD device is reflected or scattered back towards the viewer from the display area, and is attenuated by two passes through the neutral density filter and by two passes through the third polarizer.

2. A display unit as claimed in claim 1, wherein the first cover sheet comprises the third polarizer and the second cover sheet comprises the neutral density filter.

3. A display unit as claimed in claim 1, wherein the first cover sheet comprises the neutral density filter and the second cover sheet comprises the third polarizer.

4. A display unit as claimed in claim 1, wherein ambient external light incident on the LCD device and reflected or scattered back towards the viewer from the one or more border areas is attenuated by two passes through the neutral density filter and by two passes through the third polarizer.

5. A display unit as claimed in claim 4, wherein the ambient light reflected or scattered back towards the viewer from the display area is similar to the ambient light reflected or scattered back towards the viewer from the one or more border areas, so that after attenuation by the first and second cover sheets, the edge of the display unit is concealed.

6. A display unit as claimed in claim 1, wherein the first cover sheet is joined to the second cover sheet.

7. A display unit as claimed in any one of claim 1, wherein the first cover sheet and the second cover sheet are separated by a gap.

8. A display unit as claimed in claim 7, wherein the first cover sheet and the second cover sheet are not parallel with each other.

9. A display unit as claimed in claim 4, wherein, the one or more border areas are substantially planar, the first cover sheet being parallel with the one or more border areas.

10. A display unit as claimed in claim 9, wherein the display area is substantially planar, the first cover sheet being parallel with the display area.

11. A display unit as claimed in claim 10, in which the display area and the one or more border areas are substantially co-planar such that respective gaps between the display area and the one or more border areas and the first cover sheet are substantially the same.

12. A display unit as claimed in claim 11, wherein the neutral density filter transmits between 40% and 80% of light incident at a normal angle on the filter.

13. A display unit as claimed in claim 12, wherein the neutral density filter transmits between 50% and 70% of the light incident at a normal angle on the filter.

14. A display unit as claimed in claim 12, wherein the neutral density filter transmits about two-thirds of the light incident on said filter, and the ambient light returned to the viewer of the display from the display area is 0.5% of the total ambient light incident on the second cover sheet.

15. A display unit as claimed in claim 14, wherein the first and second cover sheets transmit half of the illumination from the display area out from the second cover sheet.

16. A display unit as claimed in claim 12, wherein the neutral density filter transmits about half of the light incident on said filter, and the ambient light returned to the viewer of the display from the display area is 0.25% of the total ambient light incident on the second cover sheet.

17. A display unit as claimed in claim 16, wherein the first and second cover sheets transmit one-third of the illumination from the display area out from the second cover sheet.

* * * * *